July 18, 1933.  W. E. FOSTER  1,918,463
EGG CUTTER
Filed Nov. 5, 1931   2 Sheets-Sheet 1

Inventor
W. E. Foster
By Clarence A. O'Brien
Attorney

July 18, 1933.  W. E. FOSTER  1,918,463
EGG CUTTER
Filed Nov. 5, 1931  2 Sheets-Sheet 2
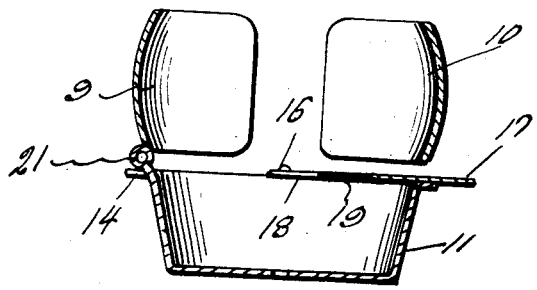
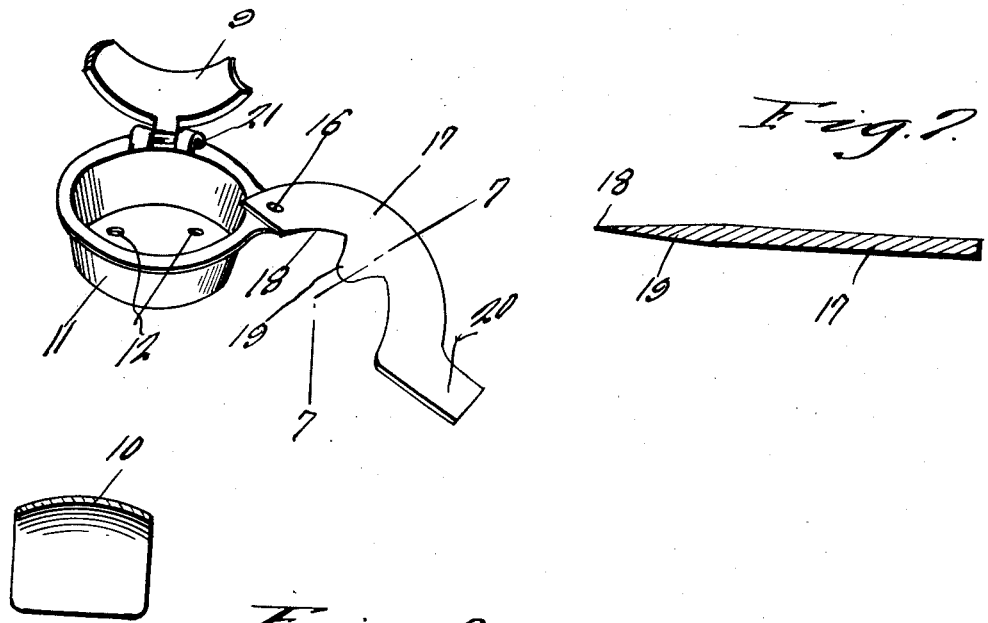
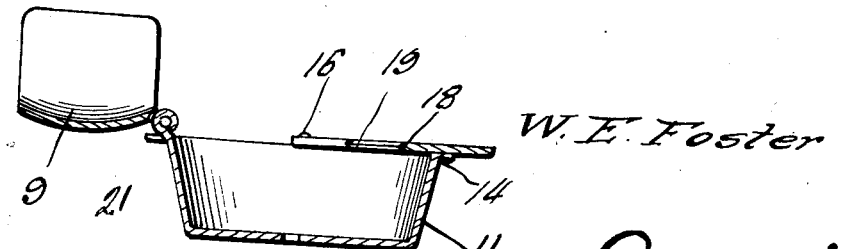
Inventor
W. E. Foster
By Clarence A. O'Brien
Attorney Patented July 18, 1933

1,918,463

UNITED STATES PATENT OFFICE

WILLIAM E. FOSTER, OF CHICAGO, ILLINOIS

EGG CUTTER

Application filed November 5, 1931. Serial No. 573,275.

This invention relates to new and useful improvements in cutting implements, and more particularly to a novel egg cutter.

The principal object of this invention is to provide an egg cutter provided with means for firmly holding an egg while it is being cut.

Another important object of the invention is to provide an egg cutter which can be manipulated easily and conveniently.

These and other important objects and advantages of the invention will become apparent to the reader of the following specification.

In the drawings:—

Fig. 4 represents a transverse sectional view taken substantially on the line 4—4 of Fig. 2.

Fig. 5 represents a fragmentary perspective view of the implement with the knife in retracted position.

Fig. 6 represents a sectional view substantially like Fig. 4, but showing the cup in tilted position.

Fig. 7 represents a sectional view taken substantially on the line 7—7 of Fig. 5.

Figure 1:
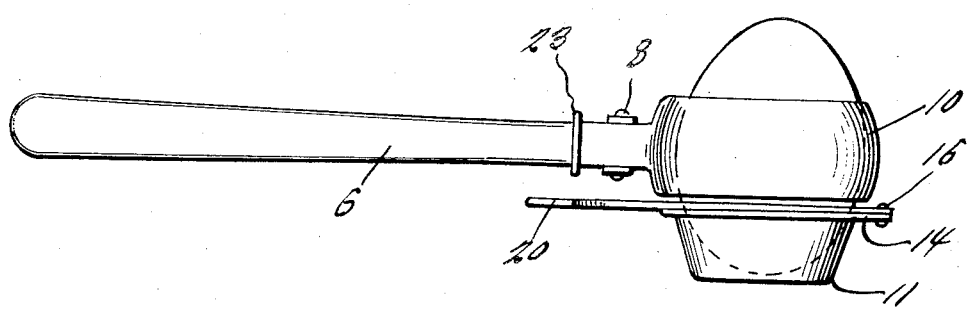
Figure 1 represents a side elevational view of the implement.
Figure 2:
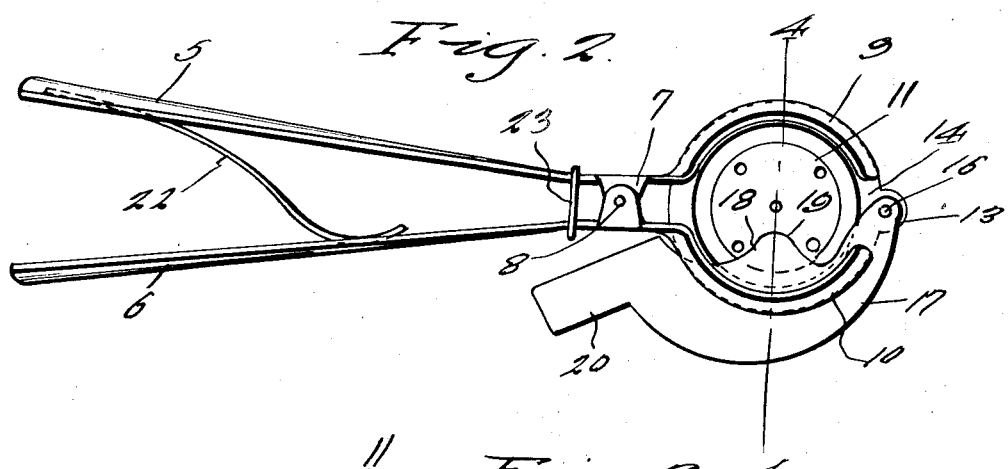
Fig. 2 represents a top plan view of the implement.
Figure 3:
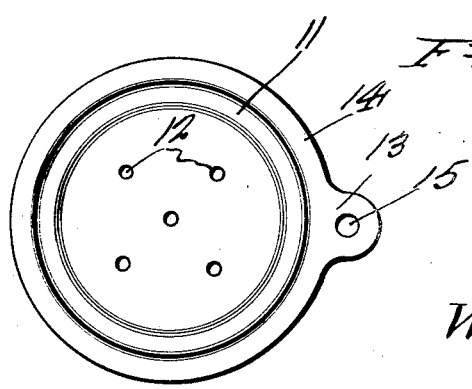
Fig. 3 represents a top plan view of the cup.

Referring to the drawings wherein like numerals designate like parts, it will be seen that numerals 5–6 represent a pair of handles having their laterally disposed ears 7 pivotally connected together by the pin 8. The end portions of the handles 5 and 6 forwardly of the pin 8 are provided with jaws 9 and 10, each being curved longitudinally and transversely to conform in a general way with the curvature of an egg.

Numeral 11 represents a cup provided with a perforated bottom, the perforations being denoted by numeral 12. Numeral 13 represents an ear projecting from the circumferential flange 14 of the cup 11 and this ear has an opening 15 therein to receive the rivet 16 which secures one end of the curved blade 17 to the cup. This blade is provided with a cutting edge 18 which extends along the intermediate protuberance 19 and projecting from the free end portion of this blade 17 is the hand grip extension 20.

The jaw 9 is hingedly connected as at 21 to the flange 14, of the cup 11 and in this manner the cup is connected to one of the parts, and is thus carried by one handle. To normally maintain the jaws contracted, a leaf spring 22 is secured at one end to one of the handles while its other end portion bears against the complementary handle. A slide ring 23 encompasses the handles and can be slid backwardly from the pivot pin 8 to maintain the jaws in expanded position.

It will now be seen that by contracting the handles 5 and 6, an egg may be perched in the cup 11 after which the jaws 9 and 10 can be brought down on the opposite sides of the egg and upon the releasement of the handles 5 and 6, the spring 22 will urge the jaws against the egg to maintain the same firmly in place. After this, the blade 17 can be readily swung inwardly for severing one end portion of the egg.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. An implement of the character described comprising a pair of pivotally connected handles, a jaw on one end of each handle, said jaws being in opposed relation, an article support on one of the said jaws for maintaining an article between the jaws, resilient means for urging said jaws toward each other and a swingable knife on the said support.

2. An implement of the character described comprising a pair of pivotally connected handles, each provided with a jaw at one of its ends, said jaws being in opposed relation, said jaws being curved longitudinally and transversely to conform with the shape of an egg, an egg supported cup swingably connected with one of the said jaws for supporting an egg between the jaws while being cut, a spring interposed between said handles for normally separating the same and urging said jaws toward each other, and means carried by said handles for rendering said spring ineffective.

3. An egg cutter comprising a cup having a lateral ear on its edge, a knife pivotally connected to said ear and swingable flat wise over said edge, opposed jaws shaped in conformity to an egg and to one of which said cup is hingedly connected to swing transversely toward and from the edges of the jaws, said jaws having handles pivotally connected together at a point spaced from the jaws, and a spring connected with the handles and tending to press the rear portions thereof away from each other and thereby yieldingly hold the jaws together for the holding of an egg therein with the end portion of the egg projecting into the cup.

WILLIAM E. FOSTER.